United States Patent [19]

Doerschlag

[11] 4,126,550

[45] Nov. 21, 1978

[54] FLASH REACTOR

[76] Inventor: Christian Doerschlag, 1289 Cranwood Sq. N., Columbus, Ohio 43229

[21] Appl. No.: 845,591

[22] Filed: Oct. 26, 1977

[51] Int. Cl.² .............................................. C02C 1/40
[52] U.S. Cl. .................................. 210/60; 210/96 R; 210/206
[58] Field of Search .................... 210/49, 60, 62, 96, 210/195 R, 201, 206, 208, 219, 220, 258

[56] References Cited

U.S. PATENT DOCUMENTS

| | | | |
|---|---|---|---|
| 2,243,826 | 5/1941 | Nielsen et al. | 210/96 R |
| 2,604,444 | 7/1952 | Piccado | 210/46 |
| 3,271,304 | 9/1966 | Valdespino et al. | 210/15 |
| 3,398,089 | 8/1968 | Mackrle et al. | 210/195 R |
| 3,682,313 | 8/1972 | Abraham et al. | 210/195 R |
| 3,722,679 | 3/1973 | Logue | 209/164 |
| 3,743,598 | 7/1973 | Field | 210/96 R |
| 4,019,983 | 4/1977 | Mandt | 210/62 |

Primary Examiner—John Adee
Attorney, Agent, or Firm—Wesley B. Taylor

[57] ABSTRACT

An apparatus for treating, such as by neutralization, oxidation, or flocculation, waste liquid streams. Waste liquid and a treating substance, such as an acid or a base, are introduced through a nozzle into a chamber and then through a second nozzle into a second chamber. The effluent from the second nozzle is directed at a sensor for an appropriate property such as pH. The rate of addition of treating substance is controlled by deviations from a set point. The effluent from the second chamber is directed to a third chamber. A portion of the contents of the third chamber is removed as product and the remainder is allowed to return to the first chamber.

17 Claims, 3 Drawing Figures

FLASH REACTOR

BACKGROUND OF THE INVENTION

1. Field of the Invention

This invention pertains to the treatment of waste liquids by, for example, neutralization, oxidation, or flocculation.

2. Description of the Prior Art

To reduce water pollution of streams, lakes, and other water sources, a large number of industrial and municipal waste waters require some sort of treatment prior to discharge. The waste liquids often have an imbalance in ion activity, causing them to be either acid or basic in varying degrees. The ion imbalance usually must be substantially removed to satisfy conditions for acceptable discharge.

The amount of acidity, alkalinity, or other ion imbalance in the waste stream must be measured and treated to assure proper neutralization and destruction or conversion of harmful ion concentrations so that waste water discharges are environmentally acceptable and harmless to aquatic life and to other subsequent users of the water. Often the waste liquid streams have variable flow rates and variable compositions which can result in fluctuations of quality and quantity of effluent discharge.

To assure a reliable and thorough treatment of waste liquids under the various inlet conditions it is known to be necessary to provide appropriate sensing and control loop instrumentation which must be capable of indicating the stream concentration parameters and responding with signals to correct any deviation from an established set point.

Treatment of waste liquids can be performed either in batch or continuous systems. For neutralization in batch systems the waste liquid is transferred to a convenient process vessel and stirred while the treating substance is added. The pH or other appropriate physicochemical property is then measured and compared to the value required for discharge. Deviations from this required value are noted and, if necessary, more treating substance is added and mixing continues until the required value has been reached.

In a batch process, the treating substance is added in increments since only after thorough mixing of the total contents of the vessel is it possible to obtain a physicochemical property measurement representative of the entire vessel and to determine whether the amount of treating substance added was correct. Waste of treating substance can be a normal result of batch treatment and the larger the treatment vessel the longer the mixing time required to obtain results of additions of the treating substance. False readings are possible by incomplete mixing which occurs when portions of unmixed treating substance contacts the measuring element; however, if time is not a factor the batch can be mixed long enough to insure desired treatment of the waste liquid.

To overcome the disadvantages of batch treatment, continuous treatment systems which can operate automatically have been developed. The desirable steps in a continuous treatment process are: collection of waste liquid in the treatment vessel; mixing of waste liquid and measurement of the value of the appropriate physicochemical property; corrective action by admission of the required treating substance, such as an acid or a base; mixing of the treating substance with the contents of the vessel; measurement of the physicochemical property after mixing; and discharge of the treated waste liquid. All of these steps have to take place within a very short time to allow the process to be continuous; the physical layout of components makes this difficult to achieve.

In a conventional continuous system for waste liquid treatment a vessel is usually used with a mechanically driven propeller mixer to agitate and provide mixing of the waste liquid with the treating substance. Such mixing vessels have very good local mixing properties but the total vessel volume must be mixed to obtain homogeneity. The retention time of individual molecules varies and many molecules which entered with the waste liquid may be discharged from the vessel without having been exposed to the treating substance. Some system designs change the position of liquid entry from the top of the vessel to the bottom of the vessel or provide for several mixing vessels in series, all in an effort to improve effluent quality.

DESCRIPTION OF THE PREFERRED EMBODIMENT

Figure 1:
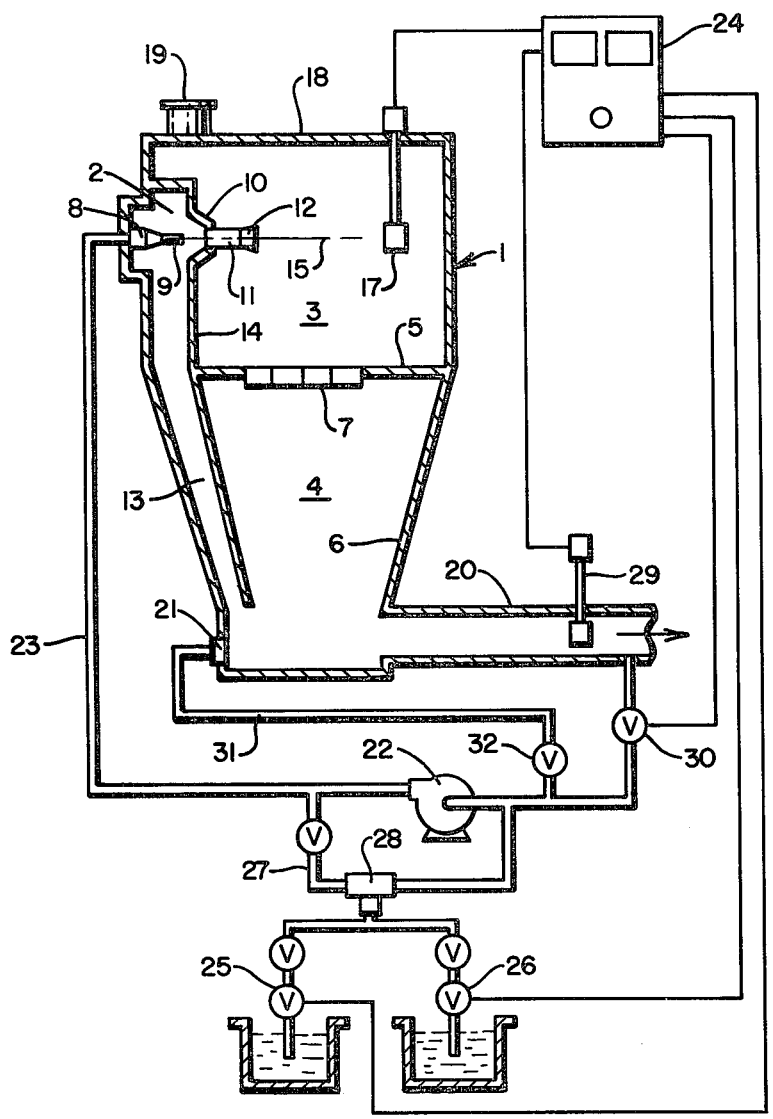
FIG. 1 is a cutaway vertical view of the Flash Reactor.
Figure 2:
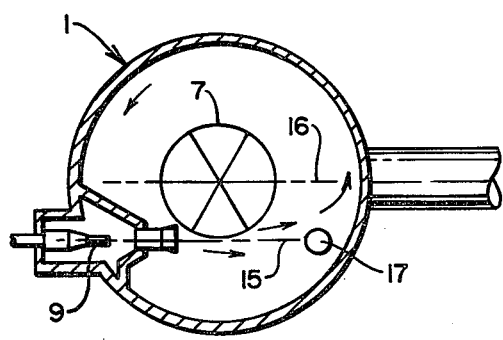
FIG. 2 is a cutaway plan view.

The Flash Reactor improves performance of a conventional continuous treatment system by minimizing the reaction zone with a reduced mixing chamber and by providing rapid response to changes in entering waste liquid quality through a minimum of dead time. Dead time is the time elapsed between addition of the treating substance and the response of the instrument measuring changes in output.

The reduced volume of the mixing chamber provides a more representative control signal from the measuring instrument probe and the short dead time allows rapid response to varying inlet conditions.

The Flash Reactor consists of a vessel 1 which is divided into three compartments 2, 3, 4. Chamber 3 and chamber 4 are separated by a barrier 5. The upper chamber 3 is preferably cylindrical in shape while the lower chamber 4 can be cylindrical or conical with the sloping sides 6 of the cone converging toward the bottom of the vessel. The upper chamber 3 and the lower chamber 4 are connected by openings 7 in the barrier separating the chambers so that the fluid from the upper chamber 3 can flow through openings 7 into the lower chamber 4. Openings 7 are designed to act as diffusers and to change direction of the liquid stream from circular flow into straight flow.

The upper chamber 3 is directly connected to chamber 2. An inlet pipe connection 8 to receive fluid from an external source extends into the interior of chamber 2 and is connected to a short nozzle 9 which is smaller in diameter than the inlet pipe connection 8. In line with nozzle 9 and a short distance away from the end of the nozzle 9 is a second nozzle or mixing tube assembly having a definite inlet section 10, intermediate section 11, and an outlet section 12. The second nozzle is of the converging-diverging type.

Fluid can travel through a passageway 13 between chamber 4 and chamber 2 if induced to do so. The inlet section of the mixing tube assembly 10, is located downstream of the nozzle 9 and penetrates through the wall 14 separating the chamber 2 from the chamber 3. The nozzle 9 and the mixing tube assembly 10, 11, 12 are arranged so that their common axial centerline 15 is offset from a radius line 16 of chamber 3.

Downstream from the outlet section 12 of the mixing tube assembly and in line with centerline 15 is a sensor 17 for a physicochemical property, such as pH, suspended from the top 18 of the chamber 3 or inserted from the side walls of the chamber 3. The top 18 of the upper chamber 3 can be open or it can be closed by a suitable cover. If the upper chamber 3 is closed on top by a cover, an opening 19 is provided in the cover for external connection to a vent.

Figure 3:
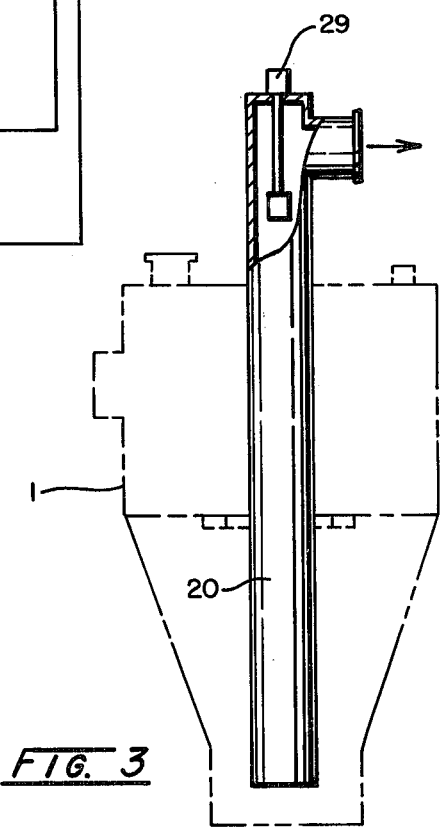
FIG. 3 is a cutaway vertical view showing an alternate arrangement of the outlet.

Extending into the bottom of the lower chamber 4 is the main fluid outlet 20 which can remove fluid from the lower chamber 4. Alternatively, an outlet 20 can extend upward as shown in FIG. 3 through the barrier 5 and diffuser 7, the chamber 3, and top 18 and discharge fluid at an elevation above the reactor vessel. A secondary outlet connection 21 is provided at the lower chamber 4. Located within the main fluid outlet 20 is an additional sensor 29 for the physicochemical property.

The operation of the invention is next described. Waste liquid from the source is piped to a pump 22 which moves the fluid through a short section of connecting pipe 23 to the reactor inlet pipe 8. The nozzle 9 causes the fluid to accelerate, converting the static pressure of the fluid stream to velocity pressure. As the high velocity jet enters the mixing tube inlet 10 the low static pressure generated by the fluid jet induces flow from the lower chamber 4 through the connecting passageway 13. The two fluid streams join and are intimately mixed in the intermediate section 11 of the mixing tube assembly. The mixing of liquids in the intermediate section 11 of the mixing tube assembly is almost instantaneous and complete and the retention time for the required mixing in the mixing zone is very short, on the order of a fraction of a second. Leaving the mixing tube assembly through the outlet section 12 the thoroughly mixed fluids are directed toward and impinge on the sensor 17. The desired physicochemical property, such as pH, of the impinging fluid is measured and a corresponding signal is sent to the control panel 24. The desired value of the physicochemical property of the effluent must have been selected on the control panel and the incoming signal is automatically compared to this set point. Any deviation from the allowable range or from the value of the set point results in a corrective signal being sent to the treating substance addition control valves 25, 26. The treating substance may be, for example, an acid or a base in a neutralization application. A short bypass line 27 from the discharge side of the pump 22 provides the motive fluid through a secondary suction tube 28 which draws treating substance into the pump suction piping.

As the treating substance is drawn through the suction piping into the pump 22 and is pushed through the nozzle 9, it is already being thoroughly mixed with the incoming waste liquid. Since the actual distance from the treating substance addition valves 25, 26 to the nozzle 9 is very short and the mixing in this distance and in the mixing tube assembly is very rapid and complete, the Flash Reactor has an actual dead time in the range of only seconds as compared to many minutes in a conventional system and can therefore quickly and accurately respond to fluctuations and variations of the incoming waste stream.

The arrangement of the mixing tube centerline 15 in relation to a radius line 16 causes the treated fluid in the upper chamber 3 to travel in a circular pattern and freely mix with the incoming portion of newly treated liquid. As the treated fluid circulates and is displaced by new entering fluid, it passes through the diffuser section 7 into the lower chamber 4. The diffuser section changes circular flow into straight flow and evenly distributes the fluid flow over the cross section of the lower chamber 4.

The lower chamber 4 allows additional time for the completion of any desired treatment and in case flocculant is added will provide the necessary retention time. The sloping sides 6 of the lower chamber 4 direct any precipitate to the fluid outlet 20.

The final control probe 29 located in the fluid outlet 20 of the reactor again checks the value of the desired physicochemical variable, such as pH, of the leaving fluid. In case deviations from the allowable range are still present, an alarm signal may be actuated and special valving 30 will be used to recycle the fluid or bypass it into a separate holding tank for further treatment.

The above description is based on treating waste liquids as for example by neutralization of acidic and basic waste flows. The Flash Reactor can well be used in the treatment of many other chemical mixing processes where results are based on controlling ion activity. If, instead of a pH sensor, an oxygen reduction potential sensor is used, the oxygen reduction potential of waste liquids can be measured and adjusted to requirements. Rapid treatment with gaseous treating substances can be accomplished by adding the gas directly to the mixing tube assembly.

To adapt the Flash Reactor to various operating conditions and to allow controlled circulation rates for liquids with unusually high waste concentrations and those requiring extended time reactions, the average retention time in the Flash Reactor can be increased by a backflow line 31. By opening valve 32 recirculation of fluid from the lower chamber 4 is initiated which will allow partially treated liquid to be returned for additional treatment.

Although the present invention has been described in part with reference to specific examples, modifications and variations may be constructed or used without departing from the scope of the invention, which is precisely described in the following claims.

I claim:

1. A continuous process for treating a waste liquid based on a physicochemical property of the treated waste liquid having a minimum delay in sensing and adjusting and physicochemical property and a relatively short retention time of the waste liquid for such treatment, said process comprising:
    (a) passing waste liquid through a pretreating entrance conduit, and into an aspirating chamber, and converting at least a portion of the static pressure of said waste liquid to velocity pressure as the liquid leaves the pretreating entrance conduit and enters said aspirating chamber to form therein an aspirating effect,
    (b) passing said waste liquid from said aspirating chamber under said velocity pressure into a primary treating chamber,
    (c) passing said waste liquid from said primary treating chamber to a secondary treating chamber,
    (d) aspirating a portion of said waste liquid from said secondary treating chamber to said aspirating chamber due to said aspirating effect therein to form a partial recycle of the treated waste liquid, (e) sensing said physicochemical property of the waste liquid substantially immediately as it enters said primary treating chamber from the aspirating chamber to determine any deviation in said physicochemical property from a predetermined value, (f) automatically adding a correcting substance to said waste liquid in said pretreating conduit in response to any deviation noted during the sensing step, and (g) removing treated waste liquid from said secondary treating chamber.

2. The process of claim 1 in which said waste liquid is subjected to a substantially circular flow in said primary chamber, and said sensing of the physicochemical property of the waste liquid takes place in said circular flow.

3. The process of claim 1 including converting said passage of the waste liquid from the primary treating chamber to a substantially linear flow in said secondary treating chamber.

4. The process of claim 1 in which said waste liquid is subjected to a circular flow in said primary chamber and to substantially linear flow in said secondary chamber.

5. The process of claim 1 in which said physicochemical property of the waste liquid is its pH, and said adding of a correcting substance to said pretreating entrance conduit is a base or acid depending on the deviation noted in said sensing step.

6. The process of claim 1 including sensing said physicochemical property of the treated waste liquid from the secondary treating chamber to determine any deviation in said physicochemical property from a predetermined value, and recycling waste liquid to said entrance conduit if said deviation exceeds a certain value.

7. Apparatus for treating a waste liquid based on a physicochemical property of the treated waste liquid providing a minimum delay in sensing and adjusting said physicochemical property and a relatively short retention time of the waste liquid for such treatment, said apparatus comprising:

(a) pretreating entrance conduit means adapted to receive and advance said waste liquid for treatment, (b) an aspirating chamber to receive waste liquid from said entrance conduit means having nozzle means for converting at least a portion of the static pressure of the waste liquid to velocity pressure as said liquid leaves the pretreating entrance conduit means and enters said aspirating chamber to create therein an aspirating effect, (c) a primary treating chamber to receive the waste liquid from said aspirating chamber, (d) a secondary treating chamber to receive the waste liquid from said primary treating chamber, said secondary treating chamber communicating with said aspirating chamber and adapted to recycle a portion of the waste liquid to said aspirating chamber in response to the aspirating effect therein, (e) exit conduit means to remove treated waste liquid from said secondary treating chamber, (f) sensing means located in said primary treating chamber adapted to sense said physicochemical property of the waste liquid substantially immediately as it enters said primary treating chamber and determine any deviation in said physicochemical property from a predetermined value, (g) a supply of a correcting substance, (h) valve means connecting said supply to said pretreating entrance conduit means, and (i) means responsive to said sensing means for operating said valve means to supply a portion of the correcting substance to the entrance conduit means in accordance with said determined deviation.

8. Apparatus of claim 7 in which said aspirating chamber is adapted to discharge the waste liquid into the primary treating chamber along a line offset from the center of said primary chamber to create therein a substantially circular flow of the waste liquid, and said sensing means is located in such circular flow.

9. Apparatus of claim 7 in which said secondary treating chamber is adapted for substantially linear flow of said waste liquid.

10. Apparatus of claim 7 in which said primary treating chamber is located above the secondary treating chamber, and said aspirating chamber extends vertically along said two treating chambers, said aspirating chamber being adapted to discharge into said primary treating chamber while communicating adjacent a lower end with said secondary treating chamber to effect said recycling of the waste liquid.

11. The apparatus of claim 10 in which said primary treating chamber has a circular cross-section, and said aspirating chamber is adapted to discharge the waste liquid into the primary treating chamber along a line offset from the center of said primary chamber to create therein a substantially circular flow of the waste liquid.

12. The apparatus of claim 10 in which said secondary treating chamber is substantially conical in cross-section and converges in a downward direction.

13. The apparatus of claim 10 having diffuser means between said primary and secondary treating chambers to aid in converting circular flow of the waste liquid to linear flow.

14. Apparatus of claim 7 having second nozzle means of the converging-diverging type between the aspirating and primary treating chambers through which the waste liquid passes in reaching the primary treating chamber.

15. Apparatus of claim 7 having two supplies of oppositely correcting substances, each supply having valve means connecting the supply to said pretreating entrance conduit means, and means responsive to said sensing means for operating each valve means to supply a portion of the correcting substance of its supply to the entrance conduit means in accordance with said determined deviation.

16. Apparatus of claim 15 in which the physicochemical property of the waste liquid is its pH, and said two supplies of oppositely correcting substances are, respectively, an acid and a base.

17. Apparatus of claim 7 including a second sensing means located in said exit conduit means to determine the presence of any deviation in said physicochemical property from a predetermined value, by-pass conduit means connecting said exit conduit means and said entrance conduit means and having valve means, and means responsive to said second sensing means for operating said valve means if said deviation of the second sensing means exceeds a certain value.

* * * * *

UNITED STATES PATENT AND TRADEMARK OFFICE
CERTIFICATE OF CORRECTION

PATENT NO. : 4,126,550
DATED : Nov. 21, 1978
INVENTOR(S) : Christian Doerschlag

It is certified that error appears in the above—identified patent and that said Letters Patent is hereby corrected as shown below:

The title page and the sole sheet of drawing should be deleted to appear as per attached title page and sheet of drawing.

Signed and Sealed this

First Day of April 1980

[SEAL]

Attest:

SIDNEY A. DIAMOND

Attesting Officer     Commissioner of Patents and Trademarks